United States Patent [19]

Hitomi et al.

[11] Patent Number: 4,996,966
[45] Date of Patent: Mar. 5, 1991

[54] SUPERCHARGED ENGINE

[75] Inventors: Mitsuo Hitomi; Toshio Nishikawa; Akinori Yamashita; Junso Sasaki; Hidefumi Fujimoto, all of Hiroshima, Japan

[73] Assignee: Mazda Motor Corporation, Hiroshima, Japan

[21] Appl. No.: 299,068

[22] Filed: Jan. 19, 1989

[30] Foreign Application Priority Data

Jan. 19, 1988 [JP] Japan ..................................... 63-9252
Oct. 26, 1988 [JP] Japan ................................. 63-270057

[51] Int. Cl.⁵ ........................ F02B 33/38; F02D 23/00
[52] U.S. Cl. ................................. 123/559.3; 123/564
[58] Field of Search .................... 123/559.1, 559.3, 564

[56] References Cited

U.S. PATENT DOCUMENTS 4,708,119 11/1987 Miyake ............................ 123/559.3
4,730,593 3/1988 Regar ........................... 123/559.3 X

FOREIGN PATENT DOCUMENTS 12892 4/1978 Japan .
19933 1/1986 Japan .
187543 8/1986 Japan .
190147 8/1986 Japan ................................. 123/559.1
197720 9/1986 Japan .
200339 9/1986 Japan ..................................... 123/564

Primary Examiner—Michael Koczo
Attorney, Agent, or Firm—Sixbey, Friedman, Leedom & Ferguson

[57] ABSTRACT

An engine is provided with a mechanical supercharger which is disposed in an intake passage of the engine and is driven by the output power of the engine. The supercharger is connected to and disconnected from the output power of the engine by a clutch. The engine has intake and exhaust valves which are opened and closed with an overlap time. A valve timing changing mechanism changes the overlap time in order to change the amount of air communicated between the intake and exhaust ports. A controller controls the valve timing changing mechanism and the clutch so that the amount of air communicated between the intake and exhaust ports is reduced and the supercharger is disconnected from the output power of the engine and does not operate when the operating condition of the engine is in a first operational range in which the amount of intake air is not more than a first preset value, the former is increased and the latter is connected with the output power of the engine so as to operate when the operating condition of the engine is in a second operational range in which the amount of intake air is not less than a second preset value which is larger than the first preset value, and the former is increased and the latter is disconnected from the output power of the engine when the operating condition of the engine is in a third operational range in which the amount of intake air is between the first and second preset values.

22 Claims, 14 Drawing Sheets

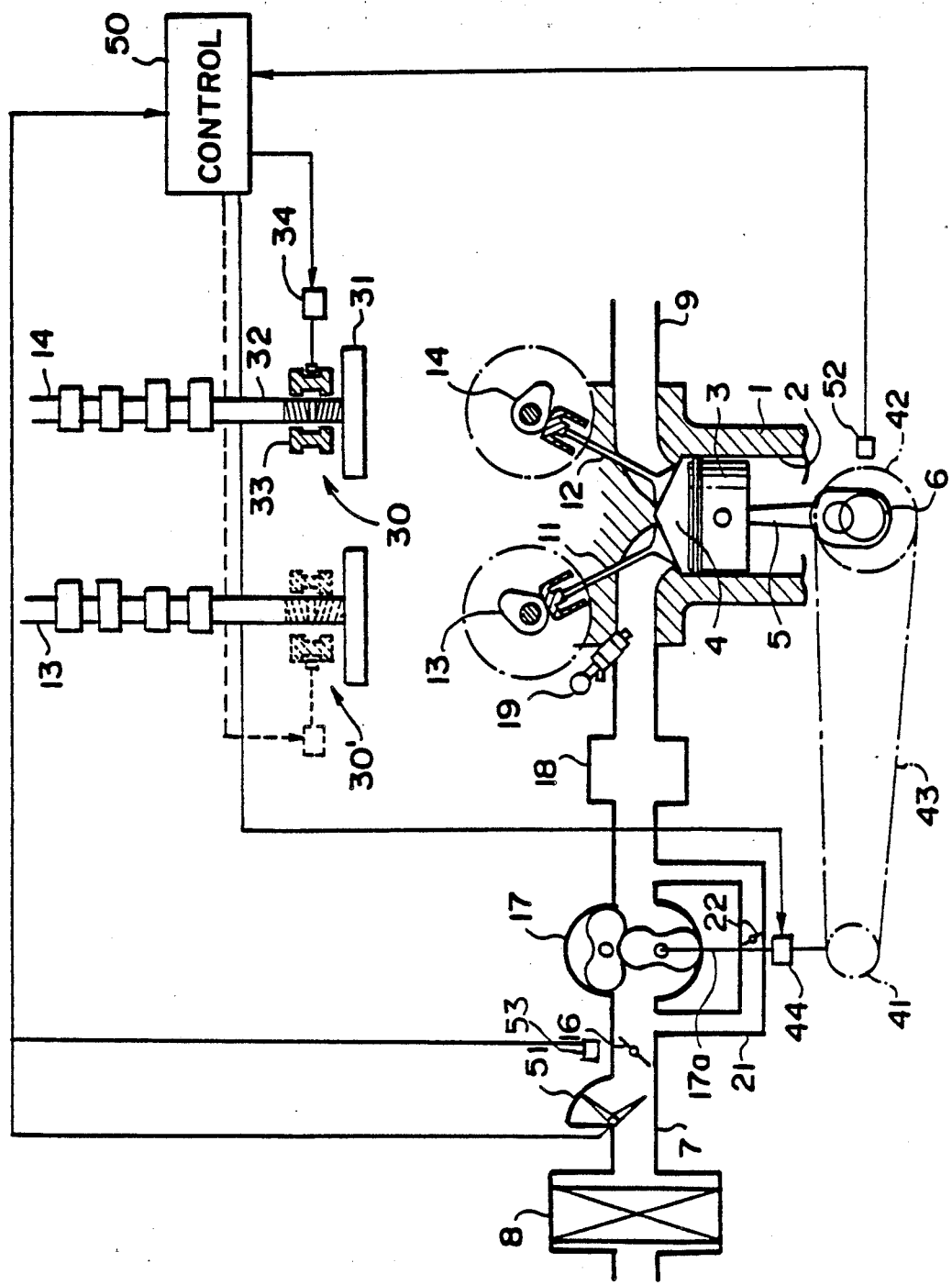
F I G.1

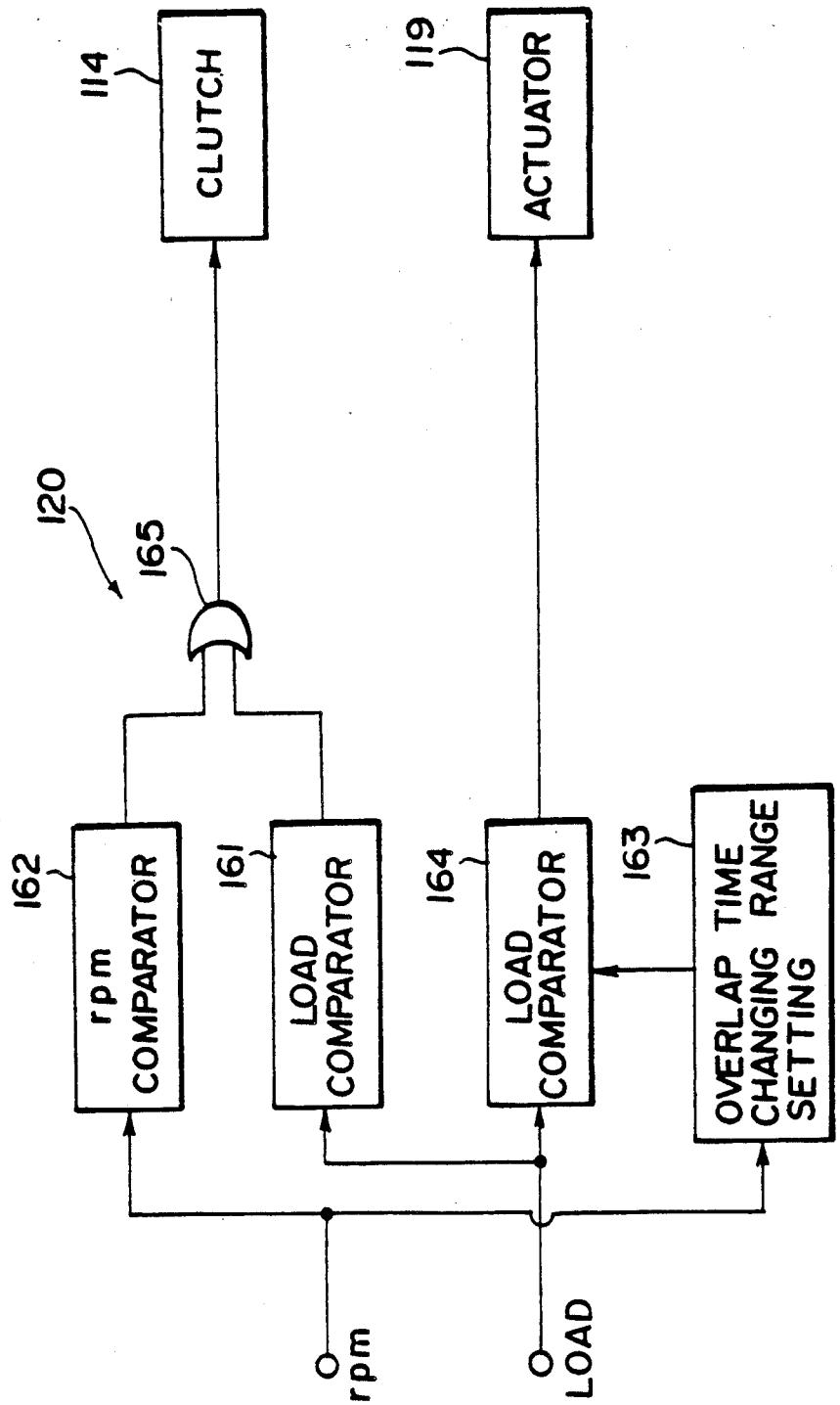

SUPERCHARGED ENGINE

BACKGROUND OF THE INVENTION

1. Field of the Invention

This invention relates to an engine provided with a mechanical supercharger which is driven by engine output power.

2. Description of the Prior Art

In an engine provided with a supercharger, the supercharger is generally driven during the operation of the engine under a heavy load in order to increase the engine output power. When the engine is supercharged, the pressure and the temperature in the combustion chamber increase, and the engine enters a state in which it may knock Knocking of the engine during supercharging can be suppressed by extending the valve overlap time, that is, the time both the intake valve and the exhaust valve are open, thereby lowering the temperature in the combustion chamber and the effective compression rate, as disclosed in Japanese Unexamined Patent Publication Nos. 61(1986)-197720 and 61(1986)-187543 and U.S. patent application Ser. No. 125,982. On the other hand, when the valve overlap time is long during the operation of the engine under a light load when the supercharger is not operated, e.g., idling, exhaust gas blows back into the combustion chamber under negative intake pressure and an excessive amount of exhaust gas mingles with the incoming air-fuel mixture, thereby deteriorating combustion in the combustion chamber. Accordingly, in accordance with the prior art, the valve overlap time is extended only when the supercharger is operated so that the amount of exhaust gas mingling with the incoming air-fuel mixture is reduced during the operation of the engine under a light load. However, it is known in the art that when the valve overlap time is long, a part of exhaust gas mingles with the incoming air-fuel mixture and an effect similar to exhaust gas recirculation can be obtained, thereby improving the fuel economy, and the supercharged engine in accordance with the prior art is disadvantageous in that this effect cannot be enjoyed during the operation of the engine under a mid-range load.

SUMMARY OF THE INVENTION

In view of the foregoing observations and description, the primary object of the present invention is to provide a supercharged engine in which the occurrence of knocking during supercharging can be effectively suppressed, and at the same time, the fuel economy can be improved.

The supercharged engine in accordance with the present invention comprises a mechanical supercharger which is disposed in an intake passage of the engine and is driven by the output power of the engine, a clutch means which connects and disconnects the supercharger to and from the output power of the engine, intake and exhaust valves which are opened and closed with an overlap time during which the valves are both open, an overlap control means for variably controlling fluid communication between the intake port and the exhaust port, an operating condition detecting means which detects the operating condition of the engine, and a control means which receives an output of the operating condition detecting means and controls the overlap control means and the clutch means so that the amount of fluid communicated between the intake and exhaust ports is reduced and the supercharger is disconnected from the output power of the engine so as to be inoperative when the operating condition of the engine is in a first operational range in which the amount of intake air is not more than a first preset value, the amount of fluid communicated between the intake and exhaust ports is increased and the supercharger is connected with the output power of the engine so as to be operative when the operating condition of the engine is in a second operational range in which the amount of intake air is not less than a second preset value which is larger than the first preset value, and the amount of fluid communicated between the intake and exhaust ports area is increased and the supercharger is disconnected from the output power of the engine when the operating condition of the engine is in a third operational range in which the amount of intake air is between the first and second preset values.

The amount of fluid communicated between the intake and exhaust ports should be interpreted as a function of the effective cross-sectional area through which the intake port and the exhaust port are communicated with each other and the overlap time for which the intake port and the exhaust port are communicated. The effective cross-sectional area corresponds to the area of an air passage which would result in the air flow obtained through varying flow paths. For example, the overlap control means may comprise a valve timing changing means which changes at least one of the intake valve closure timings and the exhaust valve opening timing so as to change the overlap time, or may comprise a control valve means which changes the effective cross-sectional area of the intake passage downstream from the supercharger. In other words, in the latter case, at least a portion of the intake passage is restricted or opened to change the effect of cross-sectional area.

The first and second preset values may be set on the basis of the engine speed and/or the engine load.

In the engine of the present invention, the supercharger is not operated and the total overlapping area is relatively large when the operating condition is in the third operational range, e.g., a middle-load middle-speed operation range, and accordingly, the pressure on the exhaust port side becomes higher than that on the intake port side and dilution gas flows into the intake passage. The dilution gas which flows into the intake passage returns to the combustion chamber after the intake valve is closed. This reduces the effective amount of new intake air and lowers the engine output power. Therefore, a larger throttle opening is required for a given engine output power and pumping loss is reduced, thereby improving the fuel economy.

BRIEF DESCRIPTION OF THE DRAWINGS

FIG. 1 is a schematic view showing a supercharged engine in accordance with a first embodiment of the present invention, FIG. 13 is a block diagram for illustrating the operation of the control unit in the second embodiment.

DESCRIPTION OF THE PREFERRED EMBODIMENTS

Figure 3:
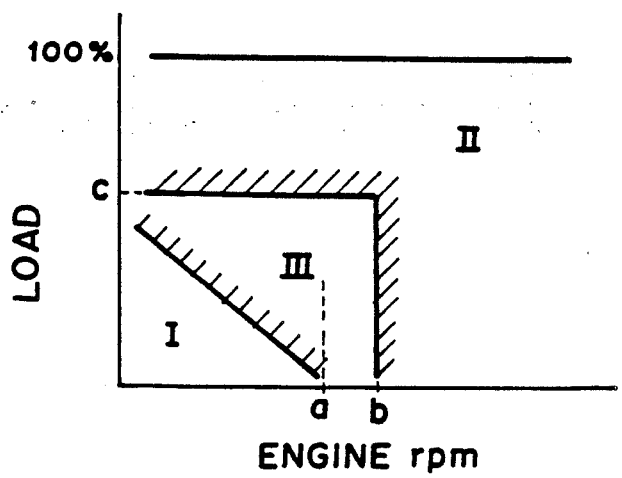
FIG. 3 is a view showing an example of the operational ranges of the engine.

In FIG. 1, a supercharged DOHC engine 1 has a cylinder 2, and a piston 3 is slidably received in the cylinder 2 to form a combustion chamber 4 therebetween. The piston 3 is connected to a crankshaft 6 by way of a connecting rod 5. The engine 1 has an intake passage 7 which opens to the atmosphere by way of an air cleaner 8 at one end and to the combustion chamber 4 at the other end. Further, the engine 1 has an exhaust passage 9 which opens to the combustion chamber 4 at one end and to the atmosphere at the other end.

The intake passage 7 is provided with an intake valve 11 at the end (the downstream side end) at which it opens to the combustion chamber 4. The exhaust passage 9 is provided with an exhaust valve 12 at the end (the upstream side end) at which it opens to the combustion chamber 4. The intake valve 11 and the exhaust valve 12 are opened and closed with respective predetermined timings by intake and exhaust cam shafts 13 and 14. A throttle valve 16 for controlling the air flow through the intake passage 7, a mechanical supercharger 17 for pressurizing the intake air, a surge tank 18 and a fuel injector 19 are provided in the intake passage 7 in this order, starting from the upstream side end thereof. The intake passage 7 is further provided with a bypass passage 21 which bypasses the supercharger 17. The bypass passage 21 is provided with a control valve 22 which is opened to introduce intake air into the combustion chamber 4 through the bypass passage 21 when the supercharger 17 is not operating.

The exhaust cam shaft 14 is provided with an exhaust valve timing changing mechanism 30 for changing the exhaust valve timing. That is, the exhaust cam shaft 14 comprises a driving gear section 31 to which the driving power is transmitted from the crankshaft 6 and a driven section 32 which is driven by the driving gear section 31. Opposed portions of the driving gear section 31 and the driven section 32 are provided with helical gears, and a sleeve 33 meshes with both the helical gears in the sections 31 and 32. The rotating phases of the sections 31 and 32 relative to each other are changed by moving the sleeve 33 in the axial direction of the cam shaft 14 by a hydraulic actuator 34, thereby changing the exhaust valve timing.

In FIG. 1, reference numerals 51, 52 and 53 respectively denote an airflow meter for detecting the rate of flow of the intake air through the intake passage 7, an engine speed sensor for detecting the engine speed, and an engine load sensor which detects the engine load through the opening of the throttle valve 16. The output signals from this meter and these sensors are input to a control unit 50.

Figure 2:
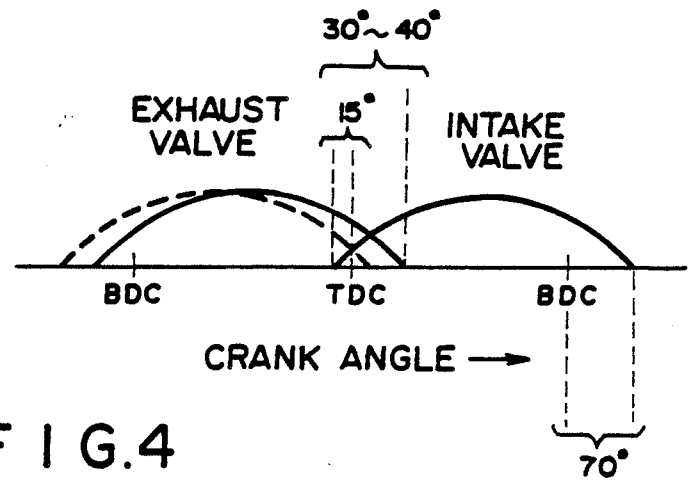
FIG. 2 is a schematic view for illustrating the operation of the valve timing changing mechanism.

The exhaust valve timing changing mechanism 30 operates under the control of the control unit 50. That is, the exhaust valve timing changing mechanism 30 retards the exhaust valve opening timing as shown by the solid line in FIG. 2 in order to extend the overlap time of the intake and exhaust valves when the operating condition of the engine 1 is in an operational range on the higher-speed and heavier-load side of the inclined line shown in FIG. 3 (which operational range will be referred to as "the larger overlap range", hereinbelow), and advances the exhaust valve opening timing as shown by the broken line in FIG. 2 in order to shorten the overlap time when the operating condition of the engine 1 is in an operational range on the lower-speed and lighter-load side of the inclined line. The overlap time when it is extended should be 30° to 40°. That is, in order to scavenge exhaust gas to lower the temperature in the combustion chamber, the overlap time should be longer than 30°. However, when the overlap time is longer than 40°, incoming air-fuel mixture flows into the exhaust passage through the combustion chamber and the engine output power is lowered. The parameter of the engine load in FIG. 3 represents the throttle opening factor, though it may be replaced by the intake air charging volume which is obtained by dividing the amount of intake air by the engine rpm. Though the valve timing changing mechanism 30 is hydraulically actuated in this embodiment, it may also be electrically actuated For example, the valve timing changing mechanism may comprise a stepping motor. Further, though the valve timing changing mechanism is provided on the exhaust cam shaft in this embodiment, a valve timing changing mechanism 30' may be provided on the intake cam shaft in addition to or instead of on the exhaust cam shaft as shown by the broken line in FIG. 1.

The mechanical supercharger 17 has a driving shaft 17a, and a driven pulley 41 is mounted on the driving shaft 17a. A crank pulley 42 is mounted on the crankshaft 6, and the driven pulley 41 and the crank pulley 42 are drivingly connected by a belt 43 to drive the supercharger 17 with the crankshaft 6. The driving shaft 17a of the supercharger 17 is provided with an electromagnetic clutch 44 which is engaged or disengaged to operate or stop the supercharger 17.

The electromagnetic clutch 44 operates under the control of the control unit 50. That is, when the operating condition of the engine 1 is in an operational range on the higher-speed and heavier-load side of the lines at right angles shown in FIG. 3 (which operational range will be referred to as "the supercharging range", hereinbelow), the clutch 44 is engaged so as to drive the supercharger 17, and when the operating condition of the engine 1 is in an operational range on the lower-speed and lighter-load side of the right-angled lines, the clutch 44 is disengaged so as to stop the supercharger 17.

That is, when the operating condition of the engine 1 is in the range on the lower-speed and the lighter-load side of the inclined line (i.e., the range indicated at I in FIG. 3, which operational range will be referred as "the first operational range I", hereinbelow), the overlap time is shortened and the supercharger 17 is not driven. When the operating condition of the engine 1 is in the supercharging range (indicated at II in FIG. 3 and sometimes referred to as "the second operational range II", hereinbelow), the supercharger 17 is operated with the overlap time extended. When the operating condition of the engine 1 is in the range between the inclined line and the right-angled lines indicated at III (which range will be referred to as "the third operational range III", hereinbelow), the overlap time is extended with the supercharger 17 stopped. The larger overlap range covers both the second and third operational ranges II and III. The boundary engine speed (indicated at a) over which the overlap time is to be extended irrespective of the engine load may be 1500 rpm, for instance. Though the third range III may be enlarged by lowering the boundary engine speed a, the boundary engine speed a should be higher than the idling engine speed. Accordingly, the boundary engine speed a is set to be higher than the engine speed to which the idling speed is increased when a load such as an air conditioner is added to the engine. The boundary engine speed (indicated at b) over which the supercharger 17 is to be operated irrespective of the engine load may be 2000 rpm, for instance. Though the third range III may be enlarged by raising the boundary engine speed b, the durability of the clutch 44 can deteriorate when the clutch 44 is turned on or off at a high engine speed, and accordingly, it is preferred that the boundary engine speed b be set as high as possible in a range within which the reliability of the clutch 44 can be ensured. Further, the boundary engine load (indicated at c) over which the supercharger 17 is to be operated irrespective of the engine speed may be 30 to 50%.

Figure 5:
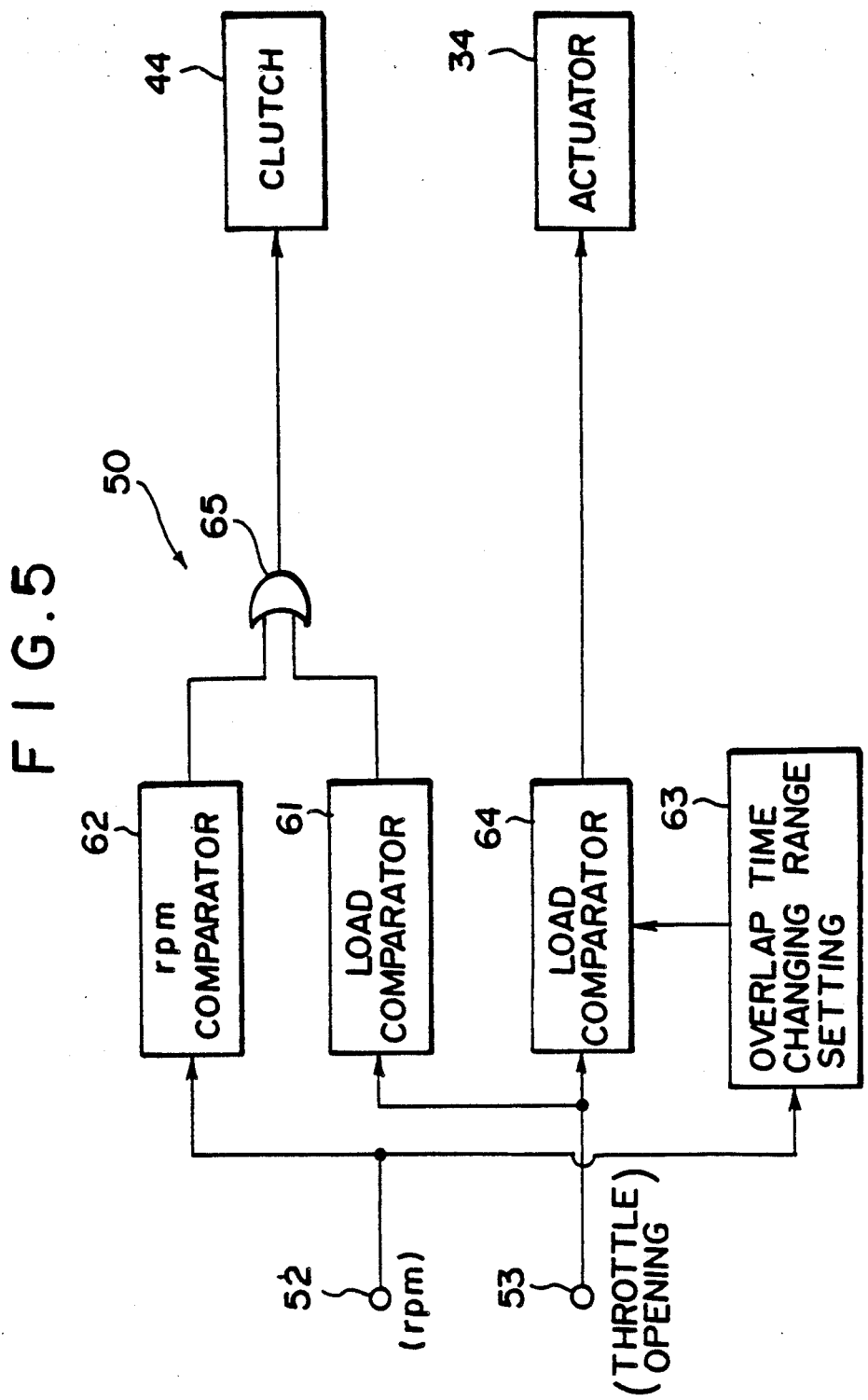
FIG. 5 is a block diagram for illustrating the operation of the control unit.
Figure 6:
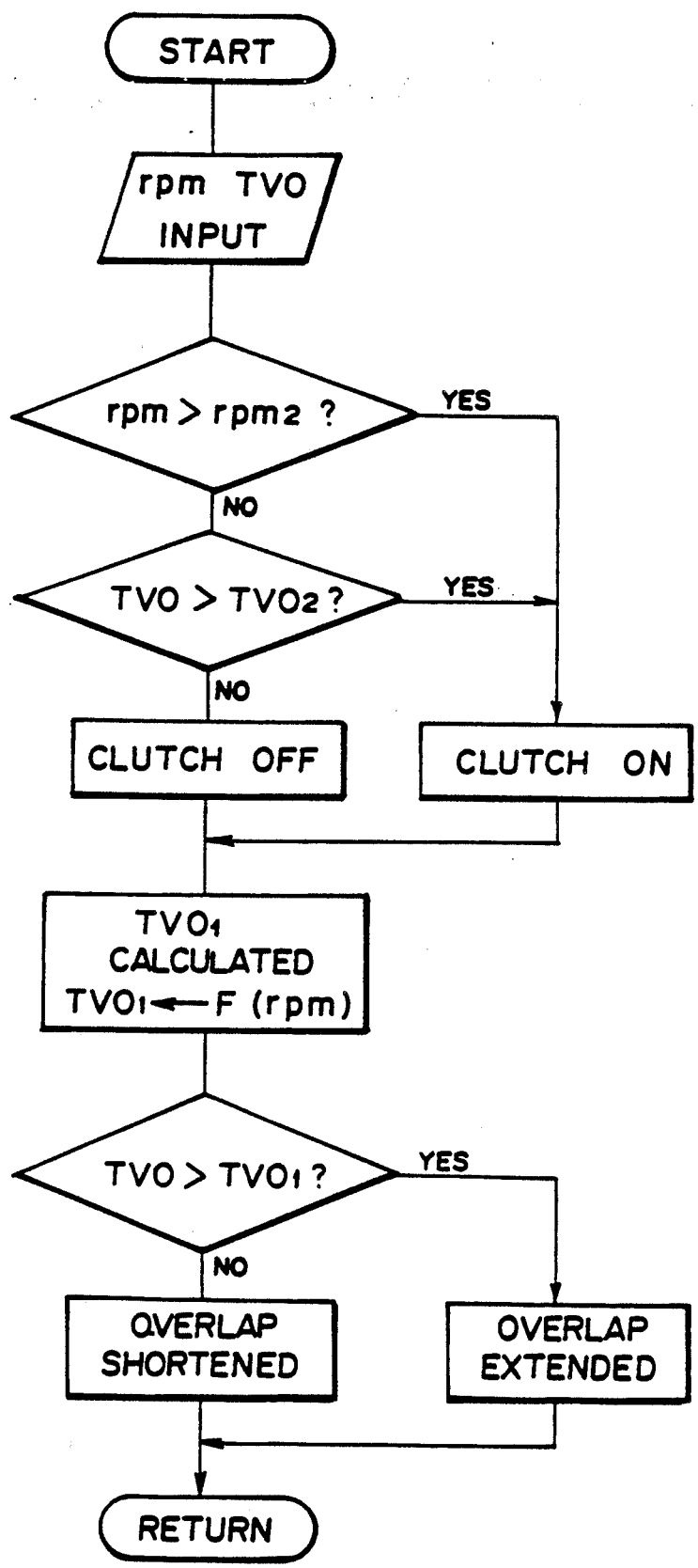
FIG. 6 is a flow chart for illustrating the operation of the control unit.

As shown in FIG. 5, the control unit 50 has a first engine load comparator 61, an engine speed comparator 62, an overlap time changing range setting circuit 63 and a second engine load comparator 64. The output signal from the engine speed sensor 52 is input into the engine speed comparator 62 and the overlap time changing range setting circuit 63, while the output signal from the throttle opening sensor (engine load sensor) 53 is input into the first and second engine load comparators 61 and 64. The first engine load comparator 61 compares the output signal TVO of the throttle opening sensor 53 with a predetermined value $TVO_2$ which represents the boundary engine load indicated at c in FIG. 3, and the engine speed comparator 62 compares the output signal rpm of the engine speed sensor 52 with a predetermined value $rpm_2$ which represents the boundary engine speed indicated at b in FIG. 3. The outputs of the first engine load comparator 61 and the engine speed comparator 62 are input into an OR circuit 65, the output of which is input into the electromagnetic clutch 44. That is, when the actual engine load TVO exceeds the predetermined load $TVO_2$ and/or when the actual engine speed rpm exceeds the predetermined speed $rpm_2$, the electromagnetic clutch 44 is energized so as to drive the supercharger 17. The overlap changing range setting circuit 63 calculates the engine load $TVO_1$ which corresponds to the actual engine speed rpm on the inclined line shown in FIG. 3, and outputs the value of the engine load $TVO_1$ to the second engine load comparator 64. The second engine load comparator 64 compares the actual engine load TVO with the engine load $TVO_1$ and drives the actuator 34 of the exhaust valve timing changing mechanism 30 to extend the overlap time when the former is larger than the latter and to shorten the overlap time when the former is not larger than the latter. FIG. 6 is a flow chart showing the operation of the control unit 30 described above.

That is, in the engine of this embodiment, the supercharger 17 is operated to supercharge the engine 1, thereby increasing the engine output power, when the operating condition of the engine is in the supercharging range or the second operational range II where the engine load is heavy and the engine speed is high. On the other hand, when the operating condition of the engine 1 is in the first operational range I or the third operational range III, the supercharger 17 is turned off and the engine 1 is operated by natural aspiration, thereby reducing fuel consumption.

Further, when the operating condition of the engine is in the second and the third operational ranges II and III, i.e., the larger overlap range, the overlap time is extended, whereby the exhaust gas scavenging efficiency is enhanced and the fuel economy is improved by an effect similar to exhaust gas recirculation as described above.

Figure 4:
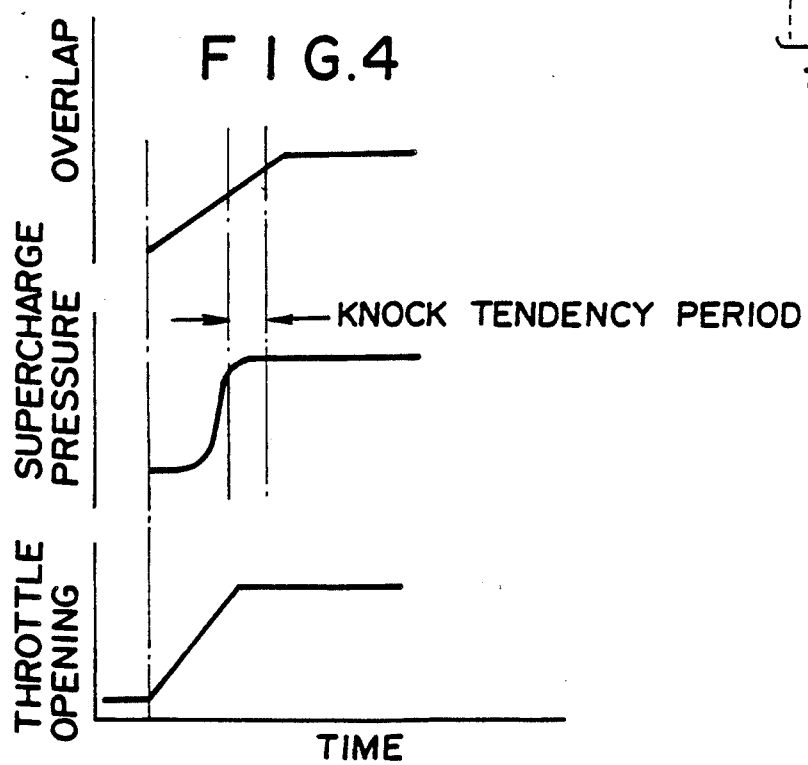
FIG. 4 is a view showing change in the valve overlap time, the supercharging pressure and the throttle opening.

Further, since the third operational range III, where the overlap time is extended while the supercharger 17 is turned off, is provided on the lower-speed and lighter-load side of the supercharging range, when the operating condition of the engine 1 shifts from a low-speed and light-load range to a high-speed and heavy-load range as when the vehicle is accelerated, as the throttle opening is increased the exhaust valve timing changing mechanism 30 is operated so as to extend the overlap time prior to the operation of the supercharger 17. That is, the supercharger 17 is turned on after the overlap time is actually extended, and accordingly, the period during which the engine 1 is supercharged before the overlap time is sufficiently extended is shortened. This period is the time during which knock tends to occur and is generated due to the time required for the valve timing changing mechanism 30 to actually change the valve overlap time. This period is shown as the "knock tendency period" in FIG. 4. In this embodiment, the knock tendency period is thus shortened and thereby knocking of the engine is suppressed. Further, since the supercharger 17 is operated only after the overlap time is sufficiently extended, the supercharging pressure can be smoothly raised.

Though anti-knock measures such as correction of the ignition timing may be taken during the knock tendency period, if desired, the period during which such anti-knock measures are necessary is short.

Figure 7:
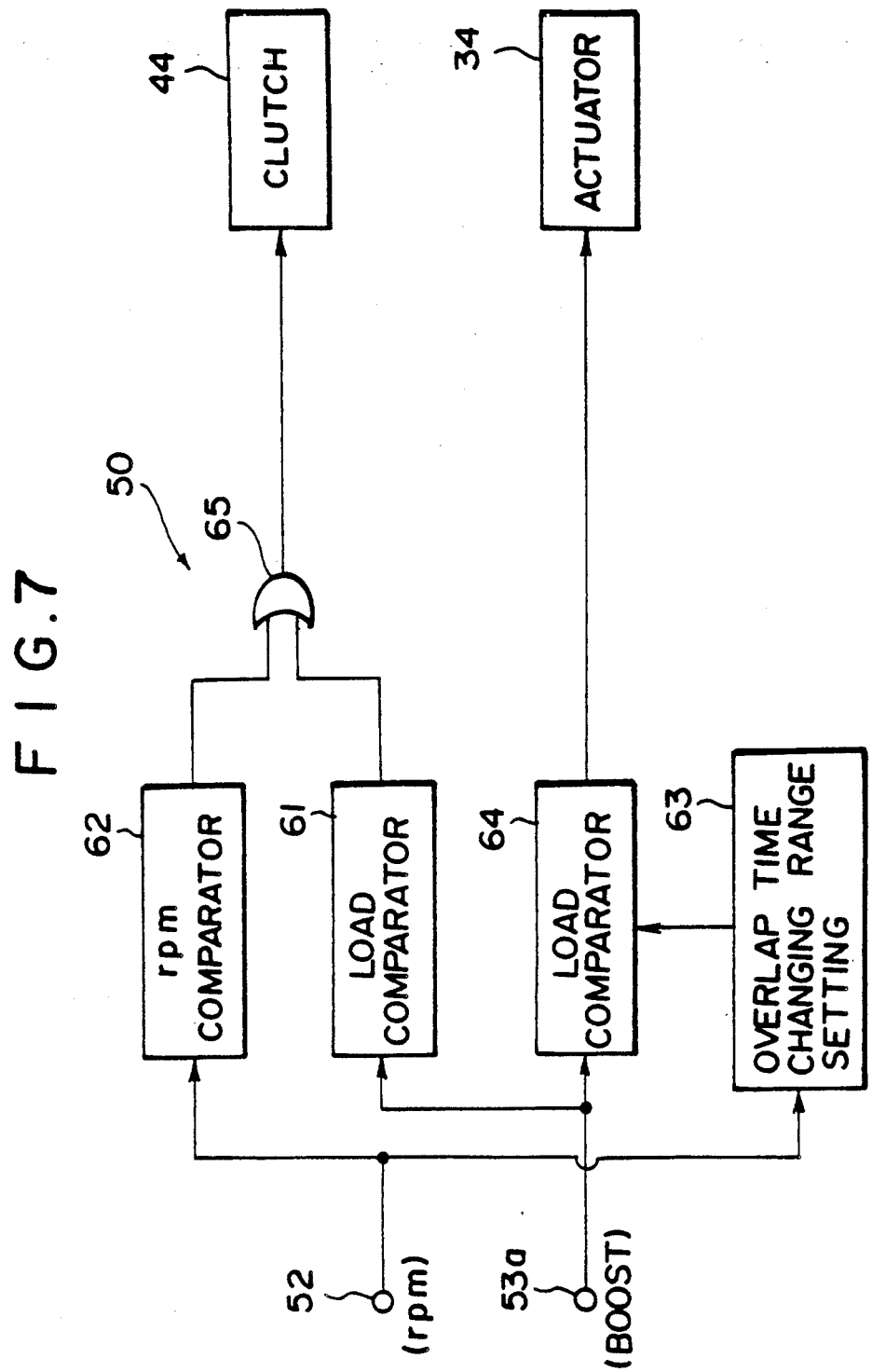
FIG. 7 is a view similar to FIG. 5 but for illustrating the operation of the control unit in a modification of the first embodiment.
Figure 8:
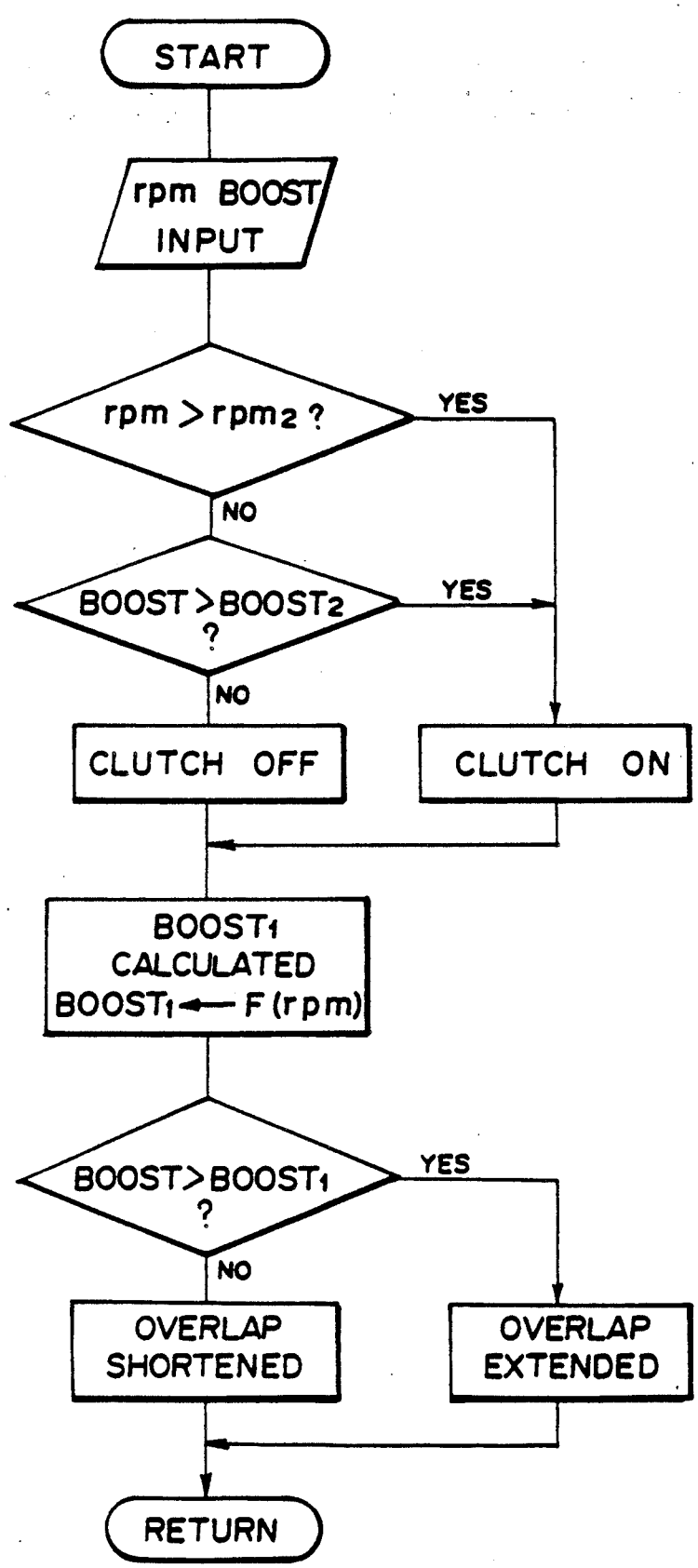
FIG. 8 is a view similar to FIG. 6 but for illustrating the operation of the control unit in the modification of the first embodiment.
Figure 9:
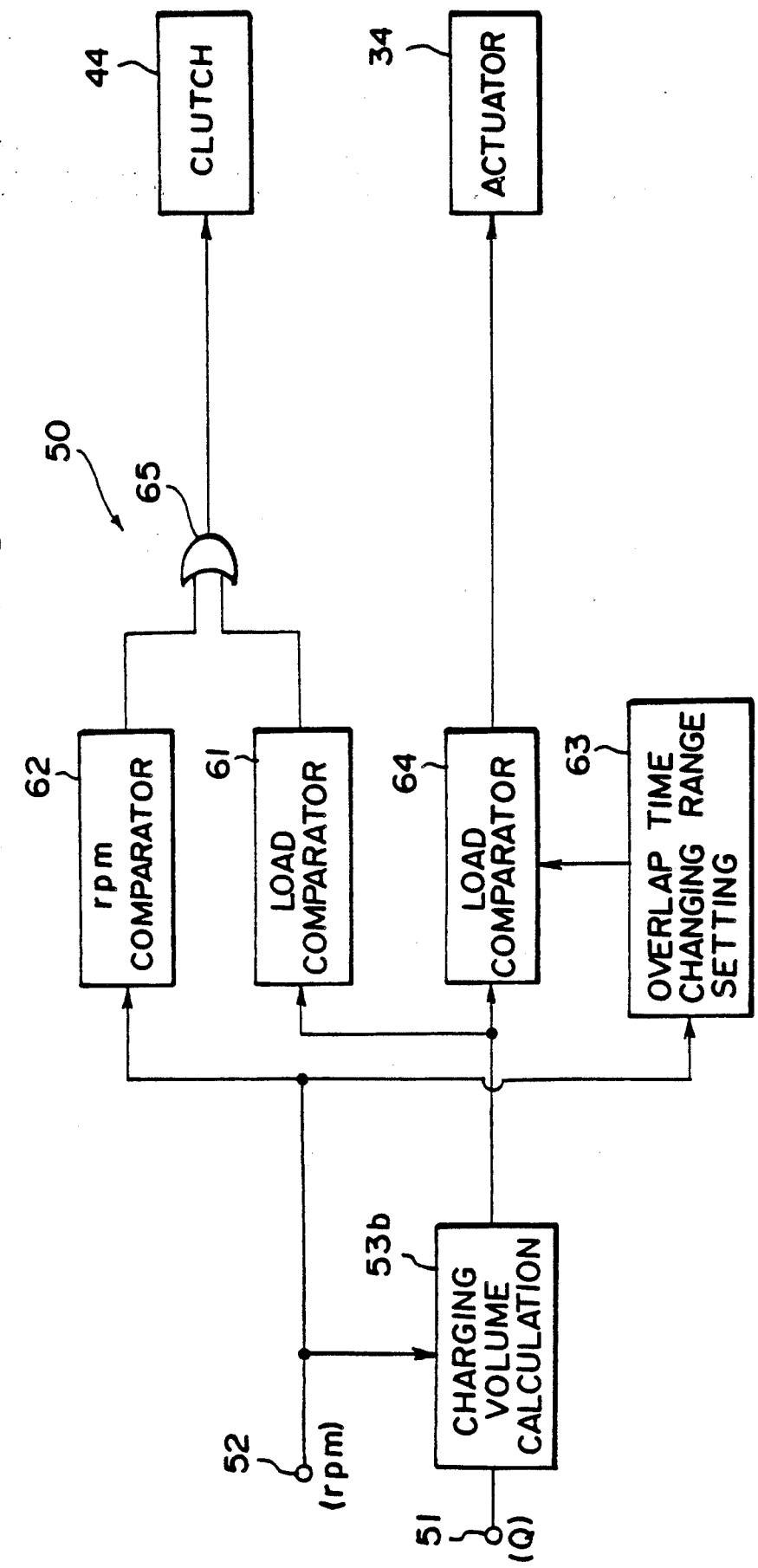
FIG. 9 is a view similar to FIG. 5 but for illustrating the operation of the control unit in another modification of the first embodiment.
Figure 10:
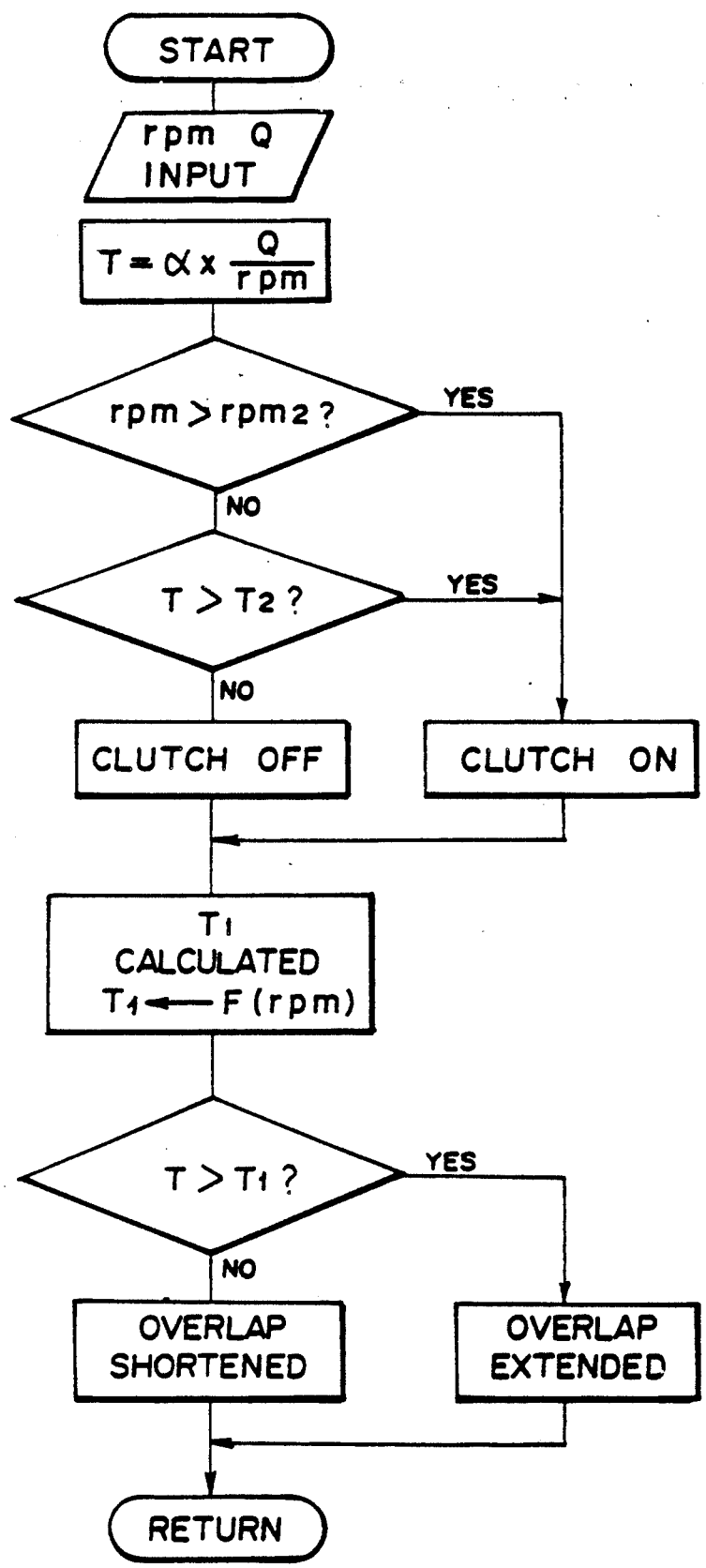
FIG. 10 is a view similar to FIG. 6 but for illustrating the operation of the control unit in the modification of the first embodiment.

Though, in the embodiment described above, the engine load is determined from the throttle opening, the engine load may be determined from the negative intake pressure (boost) as shown in FIGS. 7 and 8. In this case, the output BOOST signal of a boost sensor 53a is input into the first and second engine load comparators 61 and 64. In FIG. 8, $BOOST_1$ and $BOOST_2$ respectively correspond to $TVO_1$ and $TVO_2$ in FIG. 6. Further, the engine load may be determined from the intake air charging volume as in the modification shown in FIG. 9. In the modification, the output signal of an airflow meter 51 together with the output signal of the engine speed sensor 52 is input into an intake air charging volume calculating circuit 53b. The charging volume calculating circuit 53b calculates the intake air charging volume T on the basis of the formula, $T = a \times Q/rpm$, wherein $a$ represents a constant, and outputs the value of T thus obtained to the second engine load comparator 64. FIG. 10 is a flow chart showing the operation of the control unit 30 in this modification. In FIG. 10, $T_1$ and $T_2$ respectively correspond to $TVO_1$ and $TVO_2$ in FIG. 6.

Figure 11:
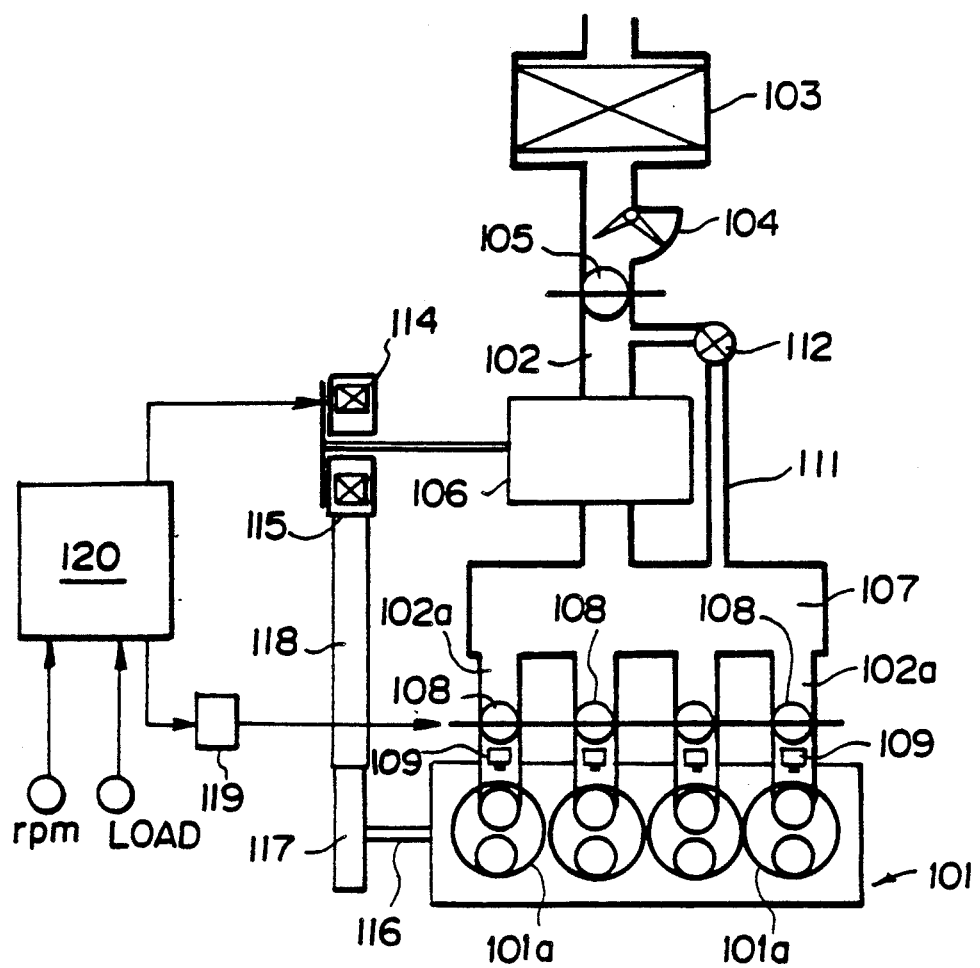
FIG. 11 is a view similar to FIG. 1 but showing a second embodiment of the present invention.

Referring to FIG. 11, a supercharged engine 101 in accordance with a second embodiment of the present invention has an intake passage 102. An air cleaner 103, an airflow sensor 104 and a throttle valve 105 are provided in the intake passage 102 in this order, starting from the upstream side. A mechanical supercharger 106 is disposed in the intake passage 102 downstream from the throttle valve 105. Further, the intake passage 102 has a surge tank 107 which communicates with cylinders 101a by way of discrete intake passages 102a. Each discrete intake passage 102a is provided with a control valve 108 which changes the effective cross-sectional area of the discrete intake passage 102a, and a fuel injector 109 is disposed downstream from each control valve 108. A relief passage 111 is provided to bypass the supercharger 106, and a relief valve 112 is provided in the relief passage 111 in order to limit the maximum supercharging pressure.

The mechanical supercharger 106 is driven by the engine output power by way of a pulley 115 to which the engine output power is transmitted through a belt 118 and a pulley 117 mounted on an engine output shaft 116. The pulley 115 is provided with an electromagnetic clutch 114 which is engaged or disengaged to drive or stop the supercharger 106 under the control of a control unit 120.

The control valves 108 in the respective discrete intake passages 102a are opened and closed by an actuator 119 under the control of the control unit 120.

An engine speed signal from an engine speed sensor (not shown) and an engine load signal from an engine speed sensor (not shown) are input into the control unit 120.

Figure 12:
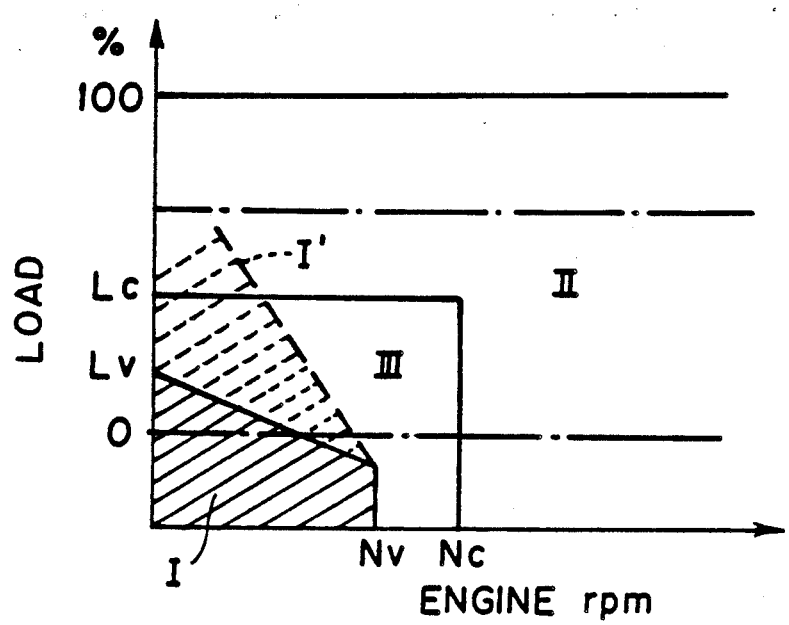
FIG. 12 is a view showing an example of the operational ranges of the engine.

In this particular embodiment, the control valves 108 function as a first control means. That is, the control valves 108 are closed to reduce the amount of air communicated between the intake and exhaust ports with the supercharger 106 held inoperative when the operating condition of the engine 101 is in a first operational range I shown in FIG. 12. When the operating condition of the engine 101 is outside the first operational range I, the control valves 108 are opened to increase the amount of air communicated between the intake and exhaust ports with the incoming air-fuel mixture. When the operating condition is in a second operational range indicated at II in FIG. 12, that is, when the engine speed is higher than a first preset speed Nc and/or the engine load is heavier than a first preset load Lc, the supercharger 106 is operated so as to increase the engine output power, and at the same time the control valves 108 are opened to increase the amount of air communicated between the intake and exhaust ports. Further, when the operating condition is in the range indicated at III between the first operational range I and the second operational range II, the control valves 108 are opened to increase the amount of air communicated between the intake and exhaust ports with the supercharger 106 held inoperative. In the first operational range I, the engine speed is lower than a second preset speed Nv which is lower than the first preset speed Nc, and the engine load is lighter than the second preset load Lv which is lower than the first preset load Lc.

When the valve overlap time is long and the supercharger is not operating, the pressure in the exhaust passage can become higher than the pressure in the intake passage and exhaust gas can flow into the intake passage from the combustion chamber. This causes an excessive amount of exhaust gas to mingle with the incoming air-fuel mixture, thereby deteriorating combustion in the combustion chamber. By closing the control valves 108 to narrow the effective cross-sectional area of the discrete intake passage 102a, the amount of exhaust gas mingling with the incoming air-fuel mixture can be limited. However, if the supercharger 106 is operated when the control valves 108 are closed, which effectively limits the amount of intake air flowing through the intake passage with respect to the opening of the throttle valve 105, the amount of intake air passing through the throttle valve 105 becomes larger than the amount of intake air passing through the control valves 108, and the pressure in the intake passage between the throttle valve 105 and the control valves 108 is increased. In such a state, the supercharger 106 has to convey a larger amount of intake air, and the driving force requirement increases, thereby increasing fuel consumption. In this embodiment, fuel economy can be improved by operating in a third operational range III, in which the control valves 108 are opened but the supercharger 106 does not operate, so that the supercharger 106 cannot be operated when the control valves 108 are closed.

With respect to the engine load, it is preferred that the control valves 108 be closed when the engine load is lighter than the engine load at which the clutch 14 is engaged to drive the supercharger 106. However, since the engine is seldom operated at a low speed under an average load, the engine load at which the control valves 108 are closed may be heavier than the engine load at which the clutch 14 is engaged in the low engine speed range as shown by the broken line in FIG. 12 (the range indicated at I'). On the other hand, with respect to the engine speed, the engine speed at which the control valves 108 are closed should be set lower than the engine speed at which the clutch 114 is engaged.

Though it is preferred from the viewpoint of reducing the driving resistance and thereby reducing fuel consumption that the first operational range I where the clutch 114 is disengaged be as wide as possible on the light-load and low-speed side, it should be set by taking into account the influence of an abrupt engagement of the clutch 114 on the durability and reliability of the clutch 114 and the influence on the supercharger 106 of torque shock due to an abrupt increase in the supercharging pressure.

The second preset engine speed Nv over which the control valves 108 are to be opened irrespective of the engine load may be 1500 rpm, for instance. Though the third range III may be enlarged by lowering the second preset engine speed Nv, the second preset engine speed Nv should be higher than the idling engine speed. Accordingly, it is set to be higher than the engine speed to which the idling speed is increased when a load such as an air conditioner is added to the engine. The first preset engine speed Nc over which the supercharger 106 is to be operated irrespective of the engine load may be 2000 rpm, for instance. Though the third range III may be enlarged by raising the first preset engine speed Nc, the durability of the clutch 114 can deteriorate when the clutch 114 is turned on or off at a high engine speed, and accordingly, it is preferred that the first preset engine speed Nc be set as high as possible in a range within which the reliability of the clutch 114 can be ensured. Further, the first preset engine load Lc over which the supercharger 106 is to be operated irrespective of the engine speed may be 30 to 50%.

Figure 14:
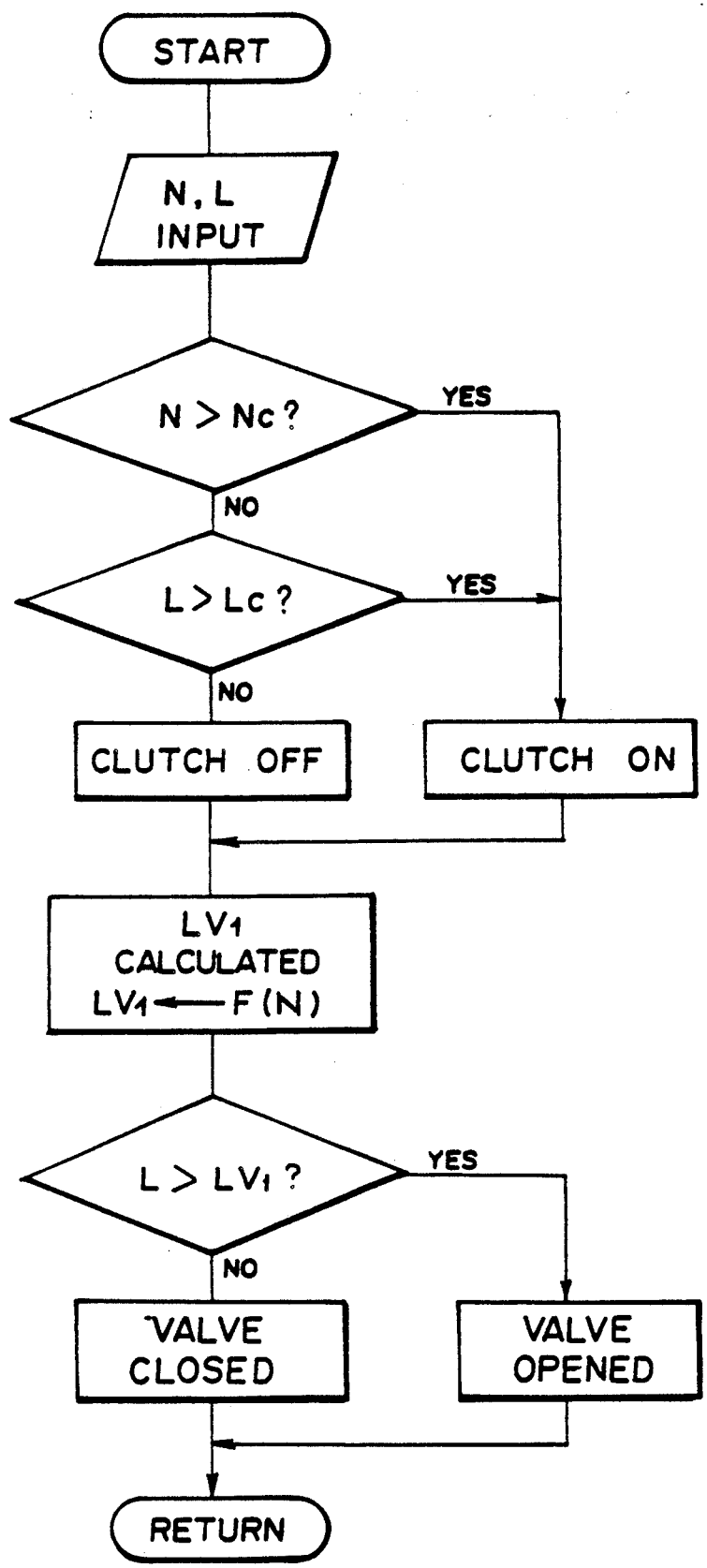
FIG. 14 is a flow chart for illustrating the operation of the control unit.

As shown in FIG. 13, the control unit 120 has a first engine load comparator 161, an engine speed comparator 162, a valve opening changing range setting circuit 163 and a second engine load comparator 164. The engine speed signal is input into the engine speed comparator 162 and the valve opening changing range setting circuit 163, while the engine load signal is input into the first and second engine load comparators 161 and 164. The first engine load comparator 161 compares the actual engine load L with the first preset engine load Lc, and the engine speed comparator 162 compares the actual engine speed N with the first preset engine speed Nc. The outputs of the first engine load comparator 161 and the engine speed comparator 162 are input into an OR circuit 165 the output of which is input into the electromagnetic clutch 114. That is, when the actual engine load L exceeds the first preset engine load Lc and/or when the actual engine speed N exceeds the predetermined engine speed Nc, the electromagnetic clutch 114 is energized so as to drive the supercharger 106. The valve opening changing range setting circuit 163 calculates the engine load $Lv_1$ which corresponds to the actual engine speed N on the inclined line shown in FIG. 12, and outputs the value of the engine load $Lv_1$ to the second engine load comparator 164. The second engine load comparator 164 compares the actual engine load L with the engine load $Lv_1$ and drives the actuator 119 of the control valves 108 so that it opens the control valves 108 when the former is larger than the latter and closes the same when the former is not larger than the latter. FIG. 14 is a flow chart showing the operation of the control unit 120 described above.

Figure 15:
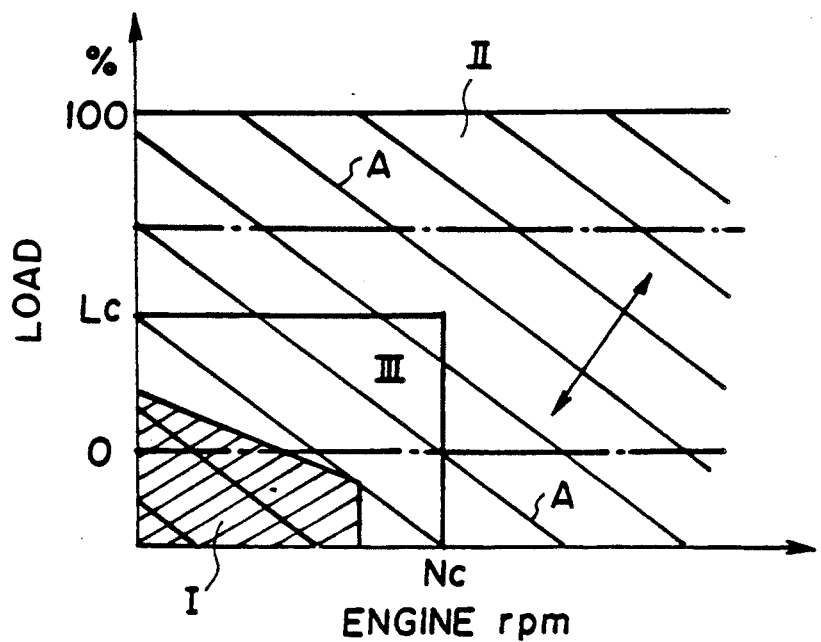
FIG. 15 is a view showing an example of the operational ranges for a modification of the second embodiment.

Though the control valves 108 are simply closed or opened, i.e. the control valves 108 have only two states, according to the operating condition of the engine 101 in the second embodiment described above with reference to FIGS. 11 to 14, the control valves 108 may be controlled so that the opening of the control valves 108 gradually increases with an increase in the engine speed N and the engine load L as shown in FIG. 15. Lines A in FIG. 15 are equi-opening lines along which the opening of the control valves 108 is the same. If the intake air charging volume increases by more than 2% when the control valves 108 are opened from a given position with the throttle valve 105 held in an initial position, it is defined in this embodiment that the control valves 108 are closed in the given position, and otherwise it is defined that the control valves 108 are opened in the given position.

Figure 16:
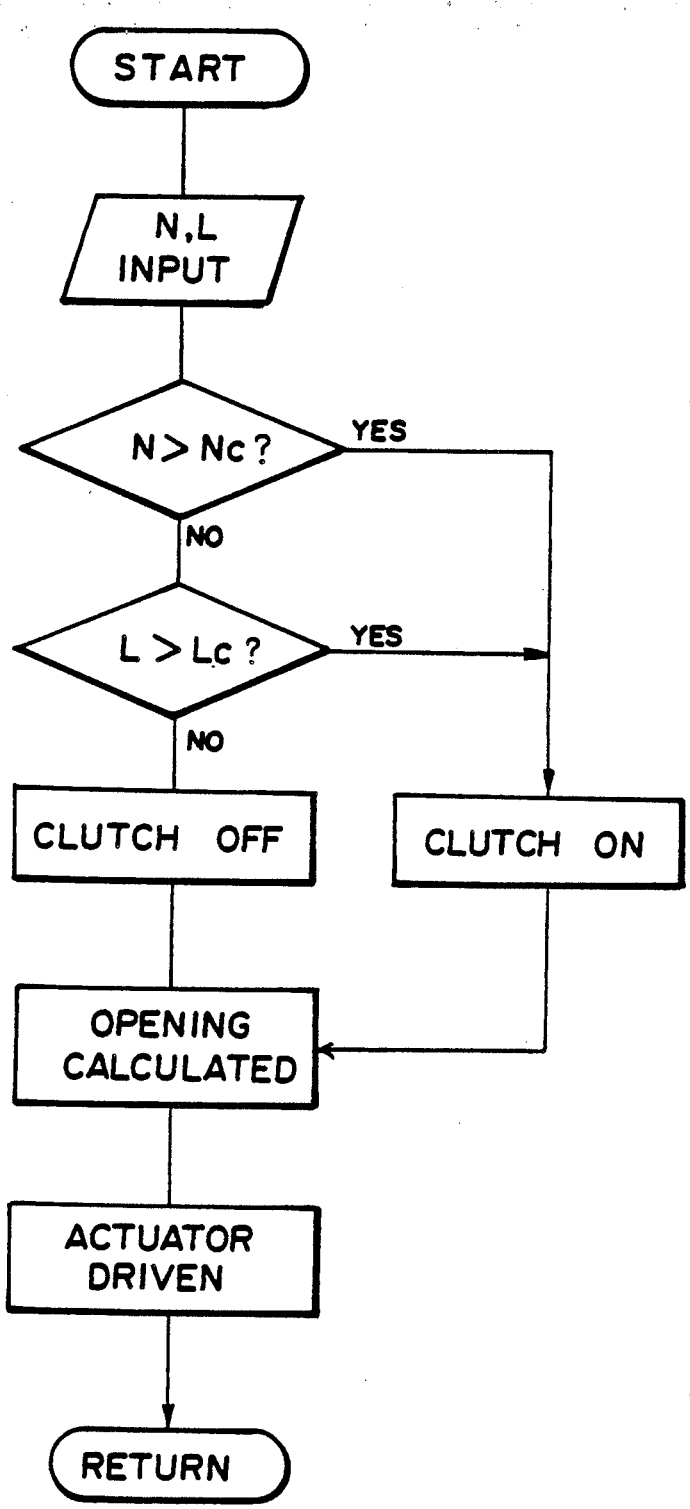
FIG. 16 is a flow chart for illustrating the operation of the control unit in the modification.

When the opening of the control valves 108 is gradually increased with an increase in the engine speed N and the engine load L, the control unit 120 calculates the opening of the throttle valves 108 on the basis of the map shown in FIG. 15 and drives the actuator 119 so that it moves the control valves 108 to a position corresponding to the opening calculated. FIG. 16 is a flow chart showing the operation of the control unit 120 in this case.

In the embodiments described with reference to FIGS. 11 to 16, exhaust gas in the combustion chambers is scavenged by supercharged intake air during the valve overlap time when the engine operates under heavy load at a high speed, whereby knock is suppressed. When the engine operates under light load at a low speed, the clutch 114 is disengaged and the control valves 108 are closed to prevent exhaust gas from flowing into the intake passage. Even after the clutch 114 is disengaged, the supercharger continues to rotate under the force of the flow of the intake air, and if the difference between the rotation of the supercharger under the force of the air flow and the rotation of the same under the engine output force is small, the resistance experienced upon engagement of the clutch 114 is relatively low and involves almost no problems. Accordingly, if the rotational speed of the supercharger during rotation under the force of the air flow without the driving force of the engine can be increased, the range in which the supercharger need not be driven can be enlarged and the fuel economy can be further improved. In this connection, by setting the opening of the control valves 108 with respect to the throttle opening so that the control valves 108 permit a larger amount of intake air to flow therethrough than the amount of intake air which the throttle valve 105 permits to flow therethrough, the air density downstream from the throttle valve 105 for a given amount of intake air is lowered and the rotational speed of the supercharger under the force of the intake air flow is increased, whereby the range in which the supercharger need not be driven can be enlarged.

Though, in the embodiments described above, the control valves 108 are controlled independently from the throttle valve 105, they may be closed or opened in response to the closure or opening of the throttle valve 105. In this case, it is preferred that the control valves 108 be opened more widely than the throttle valve 105 in the range near full closure of the throttle valve 105.

A supercharged engine 201 in accordance with a third embodiment of the present invention will be described with reference to FIGS. 17 and 18, hereinbelow. The engine 201 has an intake passage 202 which communicates with four cylinders 203 by way of four discrete intake passages 204. Each discrete intake passage 204 is divided into primary and secondary passages 204a and 204b open to the cylinder, respectively at primary and secondary intake ports. The primary and secondary intake ports are provided with first and secondary intake valves 205a and 205b. The respective secondary passages 204b are provided with control valves 205 which are integrally opened and closed by an actuator 206 under the control of a control unit 200. The control unit 200 receives output signals from a throttle position sensor 210 and an engine speed sensor 211. An exhaust passage 207 communicates with each cylinders 203 by way of a pair of exhaust ports 208 which are simultaneously opened and closed by respective exhaust valves (not shown) as shown in FIG. 18.

The first and second intake valves 205a and 205b are arranged so that the secondary intake valve 205b is opened before the primary intake valve 205a and is closed after the primary intake valve 205a is closed. Accordingly, when the secondary passages 204b are closed by the control valves 205, the effective valve overlap time is shortened, and when the secondary passages 204b are opened, the effective valve overlap time is extended. The engine 201 is further provided with a mechanical supercharger 212 connected to the engine output power by way of an electromagnetic clutch 213. The control unit 200 controls the clutch 213 and the actuator 206 of the control valves 205 according to the characteristics shown in FIG. 3.

Figure 17:
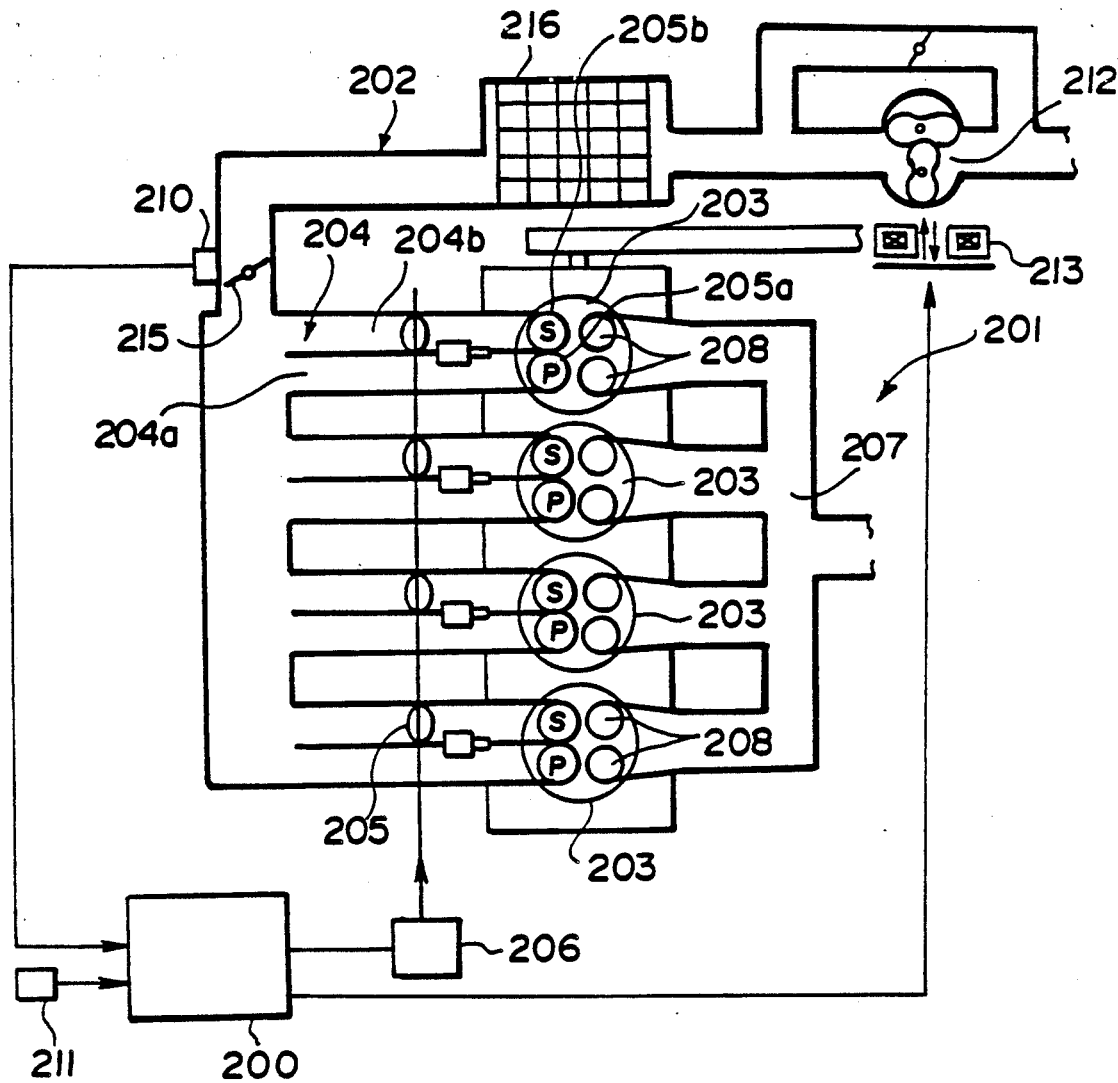
FIG. 17 is a view similar to FIG. 1 but showing a third embodiment of the present invention.
Figure 18:
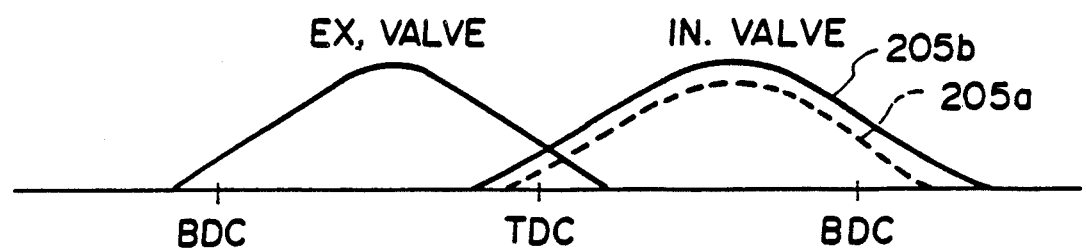
FIG. 18 is a schematic view for illustrating the valve timing in the third embodiment.

In FIG. 17, reference numerals 215 and 216 respectively denote a throttle valve and an intercooler.

We claim:

1. A supercharged engine comprising:
   a mechanical supercharger which is disposed in an intake passage of the engine and is driven by the output power of the engine;
   a clutch means which is engaged or disengaged to connect or disconnect the supercharger to or from the output power of the engine;
   intake and exhaust valves which are opened and closed with an overlap time during which the vales are both open;
   a first control means which changes the overlap time;
   an operating condition detecting means which detects the operating condition of the engine based on at least one engine factor of an amount of intake air, engine load and engine speed; and
   a second control means which receives an output from the operating condition detecting means and controls the first control means and the clutch means so that the overlap time is reduced and the supercharger is disconnected from the output power of the engine and does not operate when the operating condition of the engine is in a first operational range in which said engine factor is not more than a first preset value, the overlap time is increased and the supercharger is connected with the output power of the engine so as to operate when the operating condition of the engine is in a second operational range in which said engine factor is not less than a second preset value which is larger than the first preset value, and the overlap time is increased and the supercharger is disconnected from the output power of the engine when the operating condition of the engine is in a third operational range in which said engine factor is between the first and second preset values.

2. A supercharged engine as defined in claim 1 in which said engine factor is the amount of intake air.

3. A supercharged engine as defined in claim 2 in which said first and second preset values are set at least on the basis of the engine speed.

4. A supercharged engine as defined in claim 2 in which the first and second present values are set at least on the basis of the engine load.

5. A supercharged engine as defined in claim 2 in which the first and second present values are set on the basis of both the engine speed and the engine load.

6. A supercharged engine as defined in claim 5 in which said first control means controls the timing of the closure of the exhaust valve.

7. A supercharged engine as defined in claim 6 in which said first control mans increases the time that the intake and exhaust valves are both opened to 30 to 40 degrees of crank angle.

8. A supercharged engine as defined in claim 1 in which said engine factor is the engine load.

9. A supercharged engine as defined in claim 1 in which said engine factor is the engine speed.

10. A supercharged engine as defined in claim 1 in which said first control means controls the timing of the closure of the exhaust valve.

11. A supercharged engine as defined in claim 1 in which said first control means controls the timing of the opening of the intake valve.

12. A supercharged engine comprising:
    a mechanical supercharger which is disposed in an intake passage of the engine and is driven by the output power of the engine;
    a clutch means which is engaged or disengaged to connect or disconnect the supercharger to or from the output power of the engine;
    intake and exhaust valves which are opened and closed with an overlap time during which the valves are both open;
    a first control mans which changes the effective cross-sectional area through which the intake air and exhaust gas communicate;
    an operating condition detecting means which detects the operating condition of the engine based on at least one engine factor of an amount of intake air, engine load and engine speed; and
    a second control means which receives an output from the operating condition detecting means and controls the first control means and the clutch means so that the effective cross-sectional area is reduced and the supercharger is disconnected from the output power of the engine and does not operate when the operating condition of the engine is in a first operational range in which said engine factor is not more than a first preset value, the effective cross-sectional area is increased and the supercharger is connected with the output power of the engine so as to operate when the operating condition of the engine is in a second operational range in which said engine factor is not less than a second preset value which is larger than the first preset value, and the effective cross-sectional area is increased and the supercharger is disconnected from the output power of the engine when the operating condition of the engine is in a third operational range in which said engine factor is between the first and second preset values.

13. A supercharged engine as defined in claim 12 in which said engine factor is the amount of intake air.

14. A supercharged engine as defined in claim 13 in which said first and second preset values are set at least on the basis of the engine speed.

15. A supercharged engine as defined in claim 13 in which said first and second preset values are set at least on the basis of the engine load.

16. A supercharged engine as defined in claim 13 in which said first and second preset values are set on the basis of both the engine speed and the engine load.

17. A supercharged engine as defined in claim 16 in which said first control mans controls the timing of the closure of the exhaust valve.

18. A supercharged engine as defined in claim 17 in which said first control means increases the time that the intake and exhaust valves are both opened to 30 to 40 degrees of crank angle.

19. A supercharged engine as defined in claim 12 in which said engine factor is the engine load.

20. A supercharged engine as defined in claim 12 in which said engine factor is the engine speed.

21. A supercharged engine as defined in claim 12 in which said first control means comprises a control valve provided in the intake passage near the intake valve.

22. A supercharged engine comprising:
a mechanical supercharger which is disposed in an intake passage of the engine and is driven by the output power of the engine;
a clutch means which is engaged or disengaged to connect or disconnect the supercharger to or from the output power of the engine;
intake and exhaust valves which are opened and closed with an overlap time during which the vales are both open;
a first control means for variably controlling fluid communication between an intake port and an exhaust port during said overlap time;
an operating condition detecting means which detects the operating condition of the engine based on at least one engine factor of an amount of intake air, engine load and engine speed; and
a second control means which receives an output from the operating condition detecting means and controls the first control means and the clutch means so that the amount of fluid communicated between said intake and exhaust ports is reduced and the supercharger is disconnected from the output power of the engine and does not operate when the operating condition of the engine is in a first operational range in which said engine factor is not more than a first preset value, the amount of fluid communicated between said intake and exhaust ports is increased and the supercharger is connected with the output power of the engine so as to operate when the operating condition of the engine is in a second operational range in which said engine factor is not less than a second preset value which is larger than the first preset value, and the amount of fluid communicated between said intake and exhaust ports is increased and the supercharger is disconnected from the output power of the engine when the operating condition of the engine is in a third operational range in which said engine factor is between the first and second preset values.

* * * * *